United States Patent [19]
Goldring

[11] Patent Number: 5,440,735
[45] Date of Patent: Aug. 8, 1995

[54] SIMPLIFIED RELATIONAL DATA BASE SNAPSHOT COPYING

[75] Inventor: Robert D. Goldring, Morgan Hill, Calif.

[73] Assignee: International Business Machines Corporation, Armonk, N.Y.

[21] Appl. No.: 134,763

[22] Filed: Oct. 8, 1993

[51] Int. Cl.$^6$ ............................................. G06F 17/30
[52] U.S. Cl. ........................... 395/600; 364/DIG. 1; 364/282.4; 364/283.3; 364/283.4
[58] Field of Search ................................ 395/500, 600

[56] References Cited

U.S. PATENT DOCUMENTS

| | | | |
|---|---|---|---|
| 4,631,673 | 12/1986 | Haas et al. | 364/600 |
| 5,021,995 | 6/1991 | Quint et al. | 395/600 |
| 5,202,996 | 4/1993 | Sugino et al. | 395/700 |
| 5,369,764 | 11/1994 | Blair | 395/650 |

OTHER PUBLICATIONS

Tony P. Ng, "Propagating Updates in a Highly Replicated Database," in *Proceedings of the Sixth International Conference on Data Engineering*, Los Angeles, California, Feb. 5–9, 1990, pp. 529–536.

Gio Wiederhold and Xiaolei Qian, "Consistency Control of Replicated Data in Federated Databases," in *Proceedings, Workshop on the Management of Replicated Data*, Houston, Texas, Nov. 8–9, 1990, pp. 130–132.

Bo Kähler and Oddvar Risnes, "Extended Logging for Database Snapshot Refresh," *Proceedings of the 13th International Conference on Very Large Data Bases*, Brighton, England, Sep. 1–4, 1987, pp. 389–398.

*Primary Examiner*—Thomas G. Black
*Assistant Examiner*—John C. Loomis
*Attorney, Agent, or Firm*—Baker, Maxham, Jester & Meador

[57] ABSTRACT

A relational data base management system permits users to specify copy operations without being burdened with specifying details of structure, copy refresh algorithm, and the like. The attributes a user must specify when requesting snapshot copies is reduced by defining data structures with attributes such that specifying the name of a table, whether a user data table or snapshot, specifies the copying scheme that will be used. Any ambiguity is resolved by interactively querying the user. When a user initially defines, or registers, a source table, the user specifies a set of predefined attributes, including table structure and completeness. When a user later requests a snapshot copy, the system automatically determines the nature of the copy operation to be performed by matching the table name with its registered attributes. This permits the system to automatically determine details such as the structure of the target table, the manner in which snapshot refresh will occur, and whether the target table can be created from a snapshot copy or if the original user table must be consulted. In this way, specifying copies in a relational data base system is simplified.

14 Claims, 13 Drawing Sheets

SIMPLIFIED RELATIONAL DATA BASE SNAPSHOT COPYING

CROSS-REFERENCE TO RELATED APPLICATIONS

This application is related to the application entitled "Consistent Recreation of Events from Activity Logs" by Robert Goldring, application Ser. No. 08/134,765 filed Oct. 8, 1993 and the application entitled "Lossless Distribution of Time Series Data in a Relational Data Base Network" by Robert Goldring, also filed Oct. 8, 1993.

BACKGROUND OF THE INVENTION

1. Field of the Invention

This invention relates generally to copying data tables in a relational data base system and, more particularly, to producing, manipulating, and maintaining user defined snapshot copies of data tables in a relational data base.

2. Description of the Related Art

A relational data base comprises a collection of tables containing dam. A relational data base manager permits users and applications software to create, change, or destroy the data in the tables, the relationships between the tables, and even the structure of the tables. A query language, such as SQL, is used to manipulate the data base and retrieve query results. Many relational data bases are transaction-oriented, meaning that a data table change comprises a transaction that involves two or more related activities and that the transactions are treated in an "all-or-nothing" manner. That is, the activities comprising a transaction are followed by a commit command and none of the activities comprising a transaction is actually implemented unless all are implemented by a commit command. For example, in a transaction-oriented banking application, the first activity might comprise a debit to a table and a second activity might comprise a credit to another table, followed by an SQL commit command that completes the transaction by implementing the first two activities to thereby change the affected tables.

Through the relational data base management system, users can request copies of selected portions of the tables in a data base. These copies are created, for example, by the data base management system in response to a user SQL query that defines a selected data base portion that is of interest. These copies are often referred to as "snapshots" of the data base, because they reflect the condition of the data base at a particular point in time. Snapshots can be used to create additional copies of data tables for concurrent use by multiple users. Snapshots are generally read-only tables that are created out of the original user data base tables and cannot be changed. It can be necessary to specify many different attributes of a snapshot to enable the data base management system to extract the desired data records from the tables.

When requesting a snapshot, a user must specify a source table, from which the selected data records will be extracted, and also must specify a target table, to which the data records will be copied. It can become burdensome for a user to specify details of the copying operation. For example, to copy a table, a computer system would generally need to know where in the computer storage medium the beginning byte address of the table is located. Users, however, usually do not have such information. Users tend to think of their data tables in terms of table names. A similar situation holds for the target table. It also can be burdensome for a user to specify the structure of a copy if the user wants to make a relatively sophisticated extraction. For example, a user might want to request an aggregation of data or summary of data records that requires combining rows or columns of data tables, either by numerical addition, set intersection operators, or other complex manipulations. It would be necessary for the user to specify where the data records can be found, how they should be combined, what structure the resulting data records will have, and where to put the extracted, or copied, data records. Specifying a desired copy of a snapshot, that is, a snapshot of a snapshot, becomes even more complicated.

Another attribute of snapshots that might have to be specified relates to how changes to the source user data tables will be propagated to the snapshots. After a snapshot has been produced, it can be refreshed to reflect all changes to the source user data table since the creation of the initial snapshot or the time of the last refresh operation. For example, the original SQL query might be applied to the updated user data table, producing an updated, refreshed snapshot. It can be burdensome just to specify the frequency of refreshing a snapshot, but it can be much more so if the data base management system applies what is commonly known as differential refreshing. In differential refreshing, the amount of copying necessary to refresh a snapshot is reduced.

For example, rather than returning to the source user tables to replace an initial snapshot with a complete, updated copy of the selected portions of user tables, a data base management system can refresh an initial snapshot by propagating update information received since the initialization of the snapshot or the last prior update. Such information is generally obtained from an activity log, where all change operations to the source tables are recorded. It should be apparent that specifying the details of how to carry out such updating for a snapshot can be a daunting task for a user and may not even be possible, depending on the tables to which the user is given access. A copy algorithm would be necessary to find the proper place in the activity log to begin applying updates to source tables and these updates would need to be serialized between complete refresh operations. In requesting a snapshot copy, a user would like to be free from specifying the details of how such copying should take place and specifying the attributes of the copies. That is, the less of the copy algorithm the user must provide, the easier it will be for the user to obtain desired snapshot copies.

From the discussion above, it should be apparent that there is a need for a relational data base management system that permits users to more easily specify copy operations without being burdened with specifying details of structure, copy refresh algorithm, and the like. The present invention satisfies this need.

SUMMARY OF THE INVENTION

In accordance with the invention, the attributes a user must specify when requesting snapshot copies is reduced by defining data structures with attributes such that specifying the name of a table, whether a user data table or snapshot, specifies the copying scheme that will be used. Any ambiguity is resolved by querying the user. In a system supporting such simplified copying, when a user initially defines, or registers, a source table, the user specifies a set of predefined attributes, including table structure and completeness attributes. When a user later requests a copy, the system automatically determines the nature of the copy operation to be performed by matching the table name with its associated attributes. In this way, the system can automatically determine details such as the structure of the target table, the manner in which snapshot refresh will occur, and whether the target table can be created from a snapshot copy or if the original user table must be consulted. If more than one characteristic is possible for any attribute, then the system will query the user for the missing details. In this way, specifying copies in a relational data base system is simplified.

In one aspect of the invention, the structure of a table can be selected from among a base user table, a table containing uncommitted change transactions from an activity log, a table of committed change transactions, a snapshot copy, or an aggregate table derived from manipulations of a user table. The structure will determine, as completely as possible, the refresh scheme to be used. Another attribute specified in defining a table is that of consistency, which refers to whether a table will be updated with faithful recreation of the original transaction semantics and, if not, then with change transactions with time series data to permit undo operations. Also specified is the attribute of completeness, which refers to whether the table can be used to refresh snapshot copies. Finally, an attribute called condensed refers to whether the table includes the entire time series change history data of all user table changes during a refresh period. Other features and advantages of the present invention should be apparent from the following description of the preferred embodiment, which illustrates, by way of example, the principles of the invention.

DESCRIPTION OF THE PREFERRED EMBODIMENT

Figure 1:
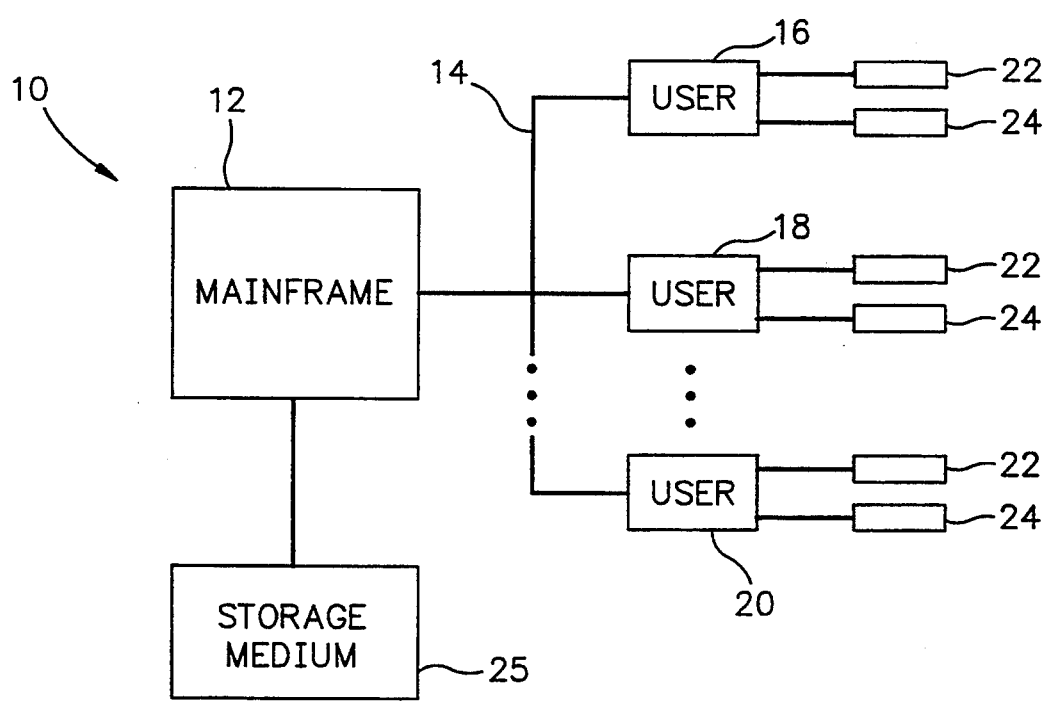
FIG. 1 is a block diagram of a computing system constructed in accordance with the present invention.
Figure 2:
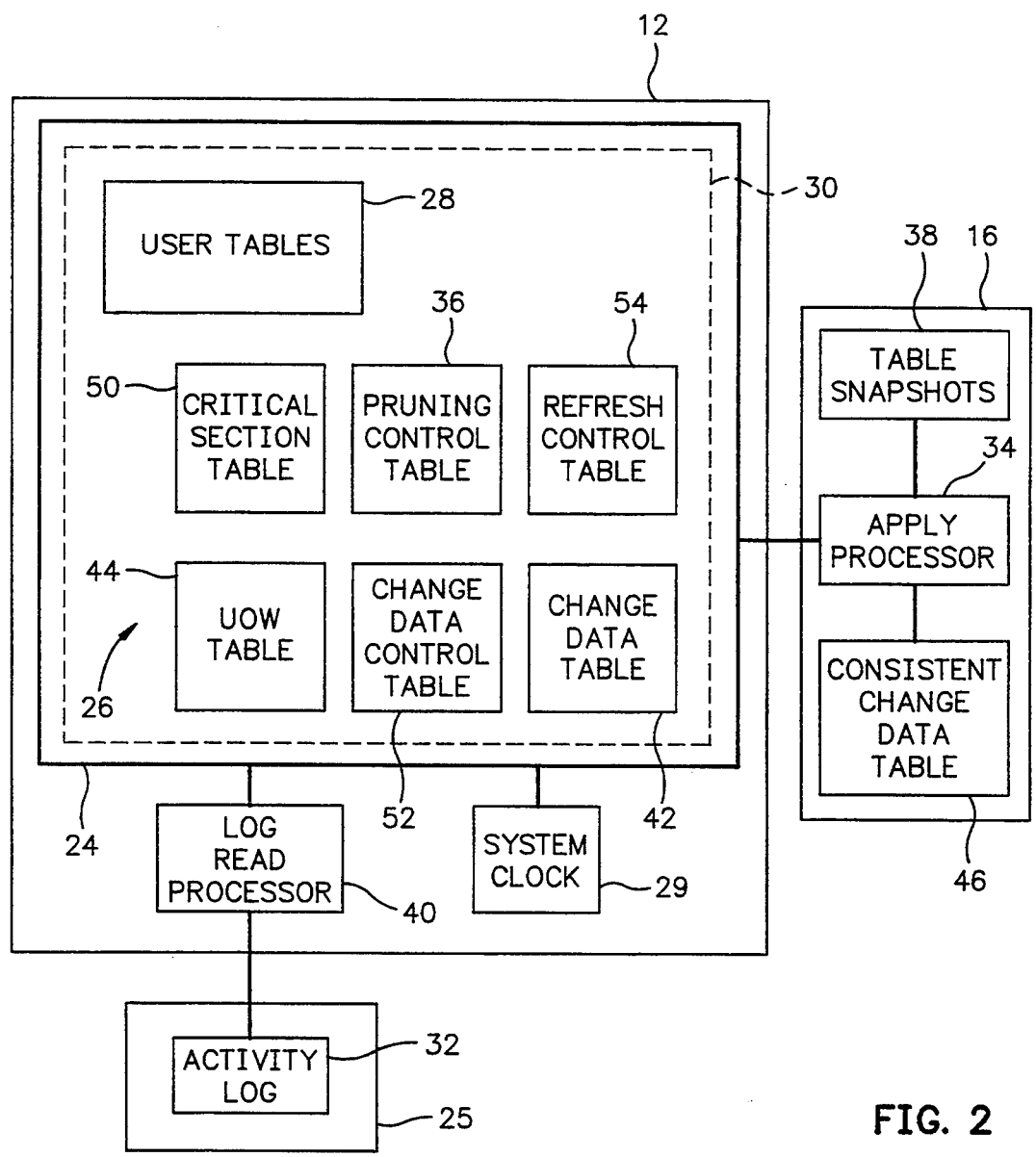
FIG. 2 is a detailed block diagram of the central processor, storage medium, and a single user of the system illustrated in FIG. 1.

With reference to the block diagrams of FIG. 1 and FIG. 2, a computing system 10 constructed in accordance with the present invention includes a central processor 12, such as an IBM Corporation "System/390" mainframe computer, and a plurality of user terminals connected to the central processor by a network 14. In FIG. 1, three users 16, 18, 20 are illustrated for purposes of example. Each user comprises a processor, such as an IBM Corporation "PS/2" personal computer, and includes a user display device, such as a video display 22, and an interactive input device, such as a keyboard 23. The mainframe computer includes a memory unit 24. A non-volatile storage medium 25 is connected to the mainframe computer. FIG. 2 shows the mainframe computer and one of the users 16 in greater detail. The flow of data is indicated by the solid lines. As illustrated in FIG. 2, the mainframe computer 12-includes a data base comprising a plurality of data tables 26 including user tables 28 defined by the users, only one user 16 of which is illustrated for simplicity. The mainframe also includes a system clock 29 that is constantly updated while the mainframe is operated and controls the mainframe operations. A data base manager 30 automatically assigns transaction numbers to the updates and records the updates and transaction numbers in an activity log 32 that is kept in the non-volatile storage medium 25. The data base manager can be any one of many data base management systems well-known to those skilled in the art. For example, IBM Corporation produces a data base management system known as "DB2". The data base manager can comprise a software process that operates in accordance with Structured Query Language (SQL) requests, a language that is well-known to those skilled in the art. The data base manager is illustrated in FIG. 2 with dashed lines to emphasize that it provides an interface between the processes and tables in the mainframe computer and all outside processes.

The data base manager 30 permits users 16 to request copies of user tables 28, such as through SQL requests that select portions of the user tables, and store them in a table referred to as a snapshot 38. In accordance with the invention, an Apply Processor 34 in each user includes an administrative interface that ensures registration of user tables and snapshot copies to permit simplified copying and automatic conversion between copy source tables having a first table structure and target tables having a second table structure. Alternatively, the administrative interface can be provided by the data base manager in the mainframe 12. The administrative interface automatically defines substantially all attributes associated with the target table based on the named source table and the attributes indicated by the request operation itself. Any remaining ambiguity is resolved by automatically querying the user to supply the missing information. After the attributes have been fully defined, the data base manager causes the copying to be executed.

All tables in the data base are registered in a ChangeDataControl table 52, which thereby informs the Apply Processor of the tables that exist for copying. After a table is registered, copying operations are carried out by the data base manager in conjunction with a subscription process controlled by the Apply Processor. The subscription process sets up the attribute definitions that permit the automatic conversion and copying between source tables and target tables. In addition, the Apply Processor maintains a RefreshControl table 54 that contains status information concerning each snapshot copy, indicating whether the snapshot copy has been initialized or copied.

In the relational data base system of the computing system 10, copying operations are made complex because the users 16, 18, 20 are constantly updating user tables and making snapshot copies of the tables, which then must be updated to incorporate the changes. Snapshot copies can have a different structure from user tables, making copy operations complex. Copy operations also are made complex because the data base management system supports making tables called aggregate tables, in which various columns of user tables or snapshots are arithmetically summed over current values or over a period of time. The former type of aggregate tables are referred to as base aggregate tables and the latter are referred to as change aggregate tables. It should be apparent that updates to user tables must periodically be propagated to the various table copies. The simplified user copying permitted by the present invention advantageously relieves a user from specifying many copy details that otherwise would have to be explicitly defined.

The system 12 therefore must associate the update operations with the snapshot copies according to the time sequence of the updates through use of the activity log 32. This process will next be described. The Apply Processor 34 in each user associates time series data with user change operations by defining a data base table 36, which will be referred to as the PruningControl table, to include a column in which a time value from the system clock 29 is recorded whenever a new copy of a user table is initialized. Because writing the system clock value into the table constitutes a table update, the data base management system 30 automatically writes the activity into the activity log 32 with an associated binary transaction sequence number. The activity log can then be consulted and the system clock value located for association with the other updates in the activity log.

The data base manager 30 resides in the program memory of the mainframe computer 12 and provides an interface for the users 16, 18, 20. A user can interactively communicate with the data base manager through the keyboard 23 and video display 22 to define data tables and update them. The data base manager will automatically create the activity log 32 and write change operations into it, thereby maintaining a change history of the data base. For example, in a transaction-oriented data base, users generate transactional updates that comprise paired change operations. In a banking system, such paired change operations might constitute a debit to a first account, or data table, and a credit to a second account, or data table. The user who generates the transactional update would complete the transaction by generating a commit operation, a standard SQL process known to those skilled in the art. Each time a user generates an update, the data base manager will assign the update a transaction number comprising a unique, ascending binary number and will record the information in the activity log. Thus, the data base manager automatically writes the change operations and commit operations into the activity log, along with their associated binary transaction numbers.

The Apply Processor 34 can comprise a software process that resides in the program memory of each computer user 16, 18, 20. The Apply Processor takes advantage of the automatic writing to the activity log by the data base manager 30 by generating the time stamp PruningControl data table 36 and updating the time stamp values contained therein. The data base manager interprets a modification to the PruningControl table as just another user modification of a data table and therefore assigns the event a transaction number. The data base manager then writes the time stamp value change operation to the activity log 32 with the transaction number. If the activity log is later consulted, the time stamp values can be located with their corresponding sequence numbers and accessed by users.

Writing time stamp values with great frequency, such as with every update, may cause noticeable delay in system operation, and therefore the Apply Processor 32 only periodically writes the time stamp value to the PruningControl table 36. For example, when a user 16 wants to examine one of the user data tables 28, the user must first initialize a snapshot copy. The Apply Processor selects the copy initialization as one of the commands for which it will also update the PruningControl table. A copy initialization is commonly referred to as a full refresh operation. Subsequent requests for a snapshot need not initialize yet another copy of the user table. Rather, only the change operations since the time of last initialization or update need be propagated to each user. The change operations can be applied to the snapshot copy kept by a user, thus ensuring a current data table copy. Such an update is referred to as a differential refresh operation. The change operations since the time of initialization or last differential refresh can be located in the activity log. The updates themselves do not include time series data. Without the PruningControl time stamp data, it would be extremely difficult to determine the point in the activity log at which to begin propagating updates to a snapshot.

To read the activity log 32, the system 10 includes a Log Read Processor 40 that reads the entries in the activity log and transfers the information from the log to two system tables, a ChangeData table 42 and a Unit of Work (UOW) table 44. The Log Read Processor preferably comprises a software process that resides in the mainframe computer 12. The system 10 generates one ChangeData table for each of the user source tables 28 and one global UOW table for the system. The Log Read Processor will read the activity log and will extract from the log, for insertion into the ChangeData table, data identifying the transaction, an intent sequence number for a change operation within a transaction, and an identifier of the type of change operation being performed. Those skilled in the art will recognize such parameters as being common to many different data base manager systems, though perhaps referred to by alternative names.

The Log Read Processor 40 also will extract, for insertion into the UOW table 44, data from the activity log 32 identifying the transaction, the commit sequence number, and a time stamp corresponding to the approximate mainframe computer central processor time when the change operation was committed by a user. The commit sequence number corresponds to the transaction number of the commit command for a committed transaction. Thus, the UOW table will contain only committed updates. In the preferred embodiment, the Log Read Processor also extracts an authorization token associated for the transaction, but this is implementation-dependent and those skilled in the art will recognize that the authorization token may not be necessary for certain applications.

A ConsistentChangeData table 46 is maintained by the Apply Processor 34, comprising only updates that have been committed. This table is formed by performing an SQL join operation on the ChangeData 42 and UOW 44 tables. Those skilled in the art will recognize that the ConsistentChangeData table is not really necessary for operation of the system; the information it contains can be obtained by joining records from the UOW and ChangeData tables as needed. Maintaining the ConsistentChangeData table, however, does reduce processing time when such information must be obtained repeatedly.

The PruningControl table 36 is used to indicate the number of user table copies provided to the users. There is one row in the PruningControl table for each snapshot table 38 that is refreshed from the ChangeData table 42. More particularly, the PruningControl table is defined by entries that specify the user name of a copy where the table copy is stored and will be refreshed, a time stamp, a pruning limit sequence number, an identifier for the user where the copy definition is stored, and an identifier for the copy structure. When a snapshot table copy is being initialized, the Apply Processor 34 the pruning limit sequence number is set to zero. Otherwise, the limit sequence number reflects the relative byte address in the activity log 32 where the change operation is located.

The Log Read Processor 40 also references a table called a Critical Section table 0. The CriticalSection table is used to provide an implementation-independent means of blocking a ChangeData table when it is being pruned. When a snapshot table is being updated, the CriticalSection table is locked in what is known as the SQL share mode, so that other snapshots may be updated but any pruning of the ChangeData table must wait. In this way, the Log Read Processor 40 and Apply Processor 34 will not conflict.

Figure 3:
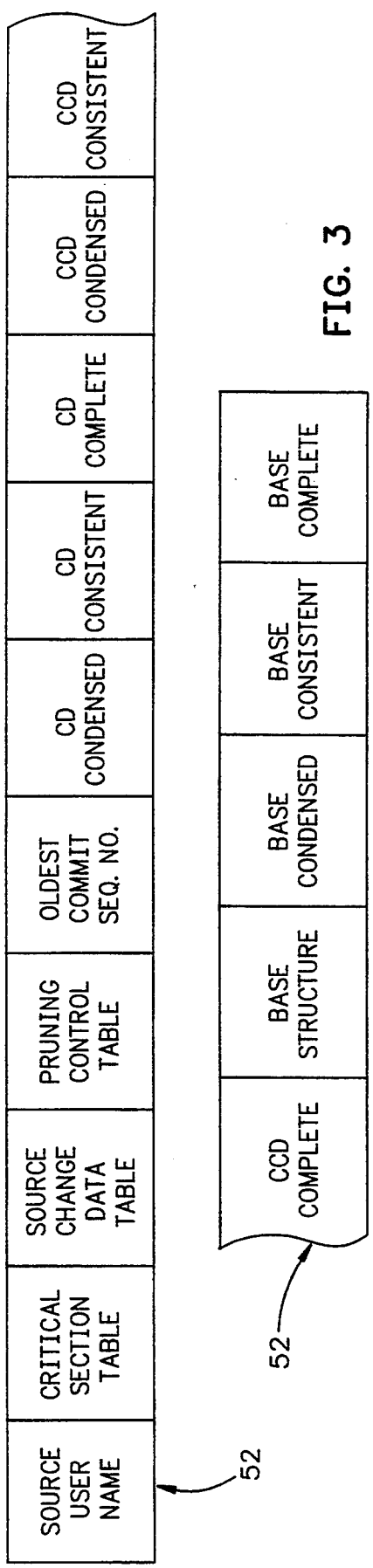
FIG. 3 is a simplified representation of the structure of the ChangeDataControl table illustrated in FIG. 2.

The Log Read Processor 40 maintains the ChangeDataControl table 52, which includes one row for each ChangeData table 42. FIG. 3 is a simplified representation of the structure of the ChangeDataControl table showing the more important column attributes. The ChangeDataControl table will link each ChangeData table with one of the source user tables 28. The ChangeDataControl table provides a means of specifying a host of control parameters, including copy mode flags, table names, user identification, and the like. For example, as shown in FIG. 3, the ChangeDataControl table preferably includes the name of the source user table whose updates are being propagated, the name of the CriticalSection table used to control access to the associated ChangeData table, the name of the ChangeData table for the source table, the name of the PruningControl table 36, the commit sequence number of the oldest row remaining in the ChangeData table, a attribute to specify if the ChangeData table is condensed, and attribute flags to indicate whether the change data is transaction consistent or complete, along with similar parameters for the ConsistentChangeData table.

In particular, the CD "condensed" attribute flag can be set to "Y" for indicating that changes may be removed from the ChangeData table, "N" for indicating that all changes must remain in the table, or to "P" for indicating that the ChangeData table can be condensed. The CD "consistency" attribute can be set to "T" to indicate that SQL compensation updates are not included in the change operation data of the ChangeData table or can be set to "C" for indicating that SQL compensation updates are included. The CCD consistency attribute refers to the same characteristics with respect to the associated ConsistentChangeData table. The CD "completeness" attribute always is set to "N" (no) to indicate the ChangeData table is not complete, while the CCD completeness attribute can be set to "Y" (yes) or to "N"0 (no) to indicate completeness with respect to the associated ConsistentChangeData table. With respect to the "completeness" attribute, a table is said to be complete if there is a row for every primary key value of interest that is present in the base, or source, table. An incomplete table may be missing primary keys and the rows they identify.

In the ChangeDataControl table, the base structure attribute can be set to flags indicating a user table, a ConsistentChangeData table, a snapshot or point-in-time copy, a base aggregate table, or a change aggregate copy. The "base condensed" attribute flag can be set to "Y", "P", or "N" for indicating attributes for the source table that are the same as those described for the CD condensed flag. The base condensed flag also can be set to "A" for indicating a base aggregate or change aggregate source table. Similarly, the base consistent and base complete attributes indicate the same characteristics for the source table as associated with the like-named ChangeData attributes of the ChangeDataControl table, although it should be noted that for a source table that is a user table, the base consistent attribute must be "T" and the CD consistent attribute can be "C" or "T".

Figure 4:
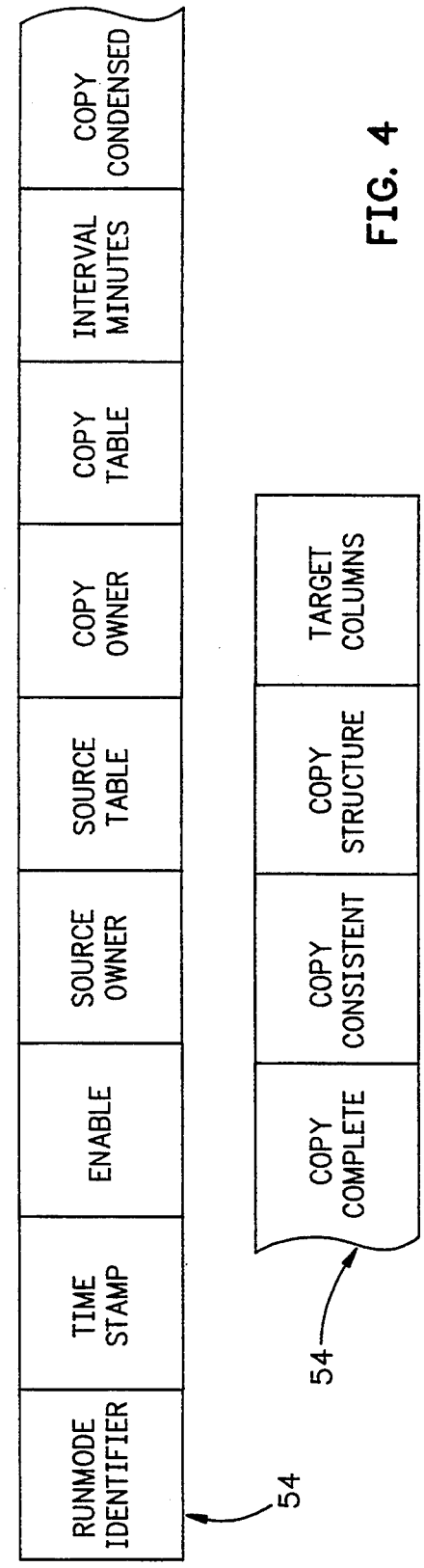
FIG. 4 is a simplified representation of the structure of the Refresh Control table illustrated in FIG. 2.

FIG. 4 is a simplified representation of the structure of the Refresh Control table 54 showing the more important column attributes. The Refresh Control table contains identifiers for a source-based table and associated attributes, a target table and associated attributes, and an indication of how refresh operations will be scheduled and carried out. For example, as shown in FIG. 4, the table includes a runmode identifier that can be set to "FA" for indicating that a full refresh algorithm to append rows to the copy in accordance with log sequence numbers is to be used. Alternatively, the runmode identifier can be set to "FR" for indicating that a refresh algorithm for full refresh with prior delete to replace the copy is to be used. Similarly, a runmode identifier set to "AO" refers to automatic refresh with logic that completes a differential refresh operation if it is not possible to distinguish between reduced update activity and a disabled log read program, a runmode identifier set to "AP" refers to a refresh algorithm in which the differential refresh cycle is not completed and if it is not possible to distinguish between reduced update activity and log read program failure, a failure is assumed, and, lastly, a runmode identifier can be set to "EI" for indicating an immediate execution operation. The Refresh Control table also includes a time stamp value that is set to null initially and whenever a full refresh (initialization) is attempted and fails. The time value otherwise corresponds to the approximate value of the last successful full refresh operation, which should correspond to the previously read time value from the activity log 32. The Refresh Control table also includes attributes for interval minutes, which is the value in minutes for the refresh cycle time. At the expiration of the interval, the source table will be refreshed.

Figures 5, 6, 7:
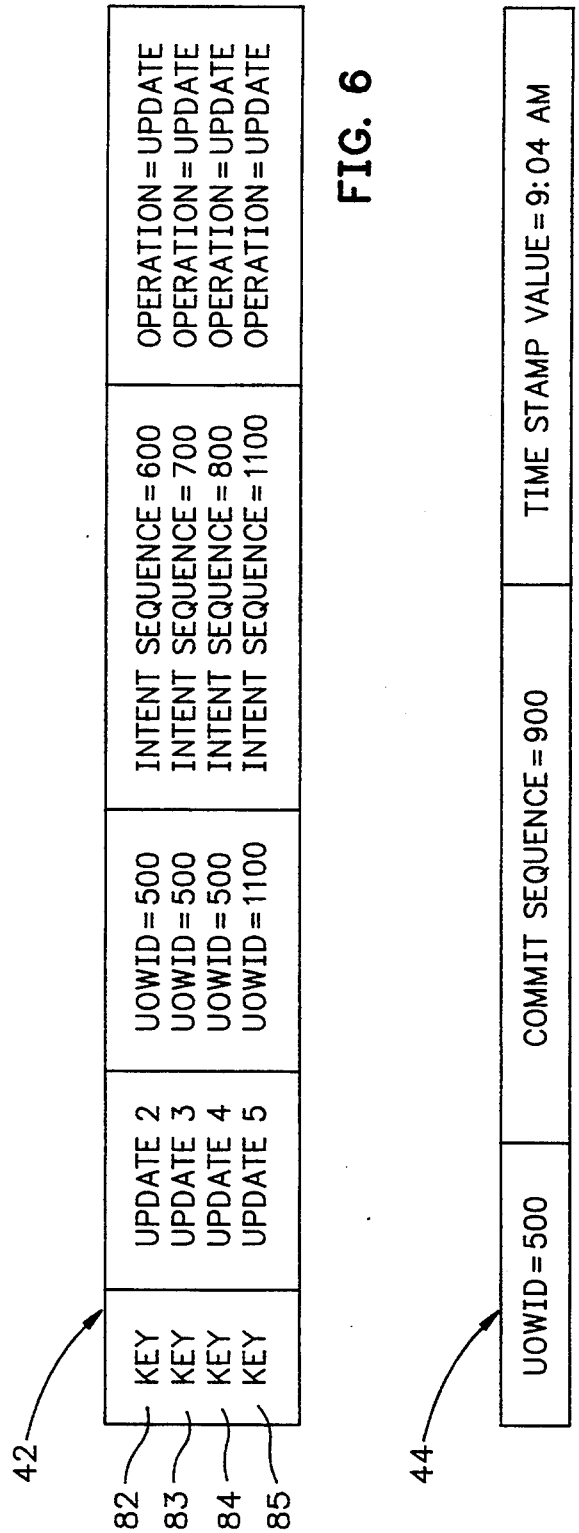
FIG. 5 is a representation of a portion of an activity log recorded by the system illustrated in FIGS. 1 and 2.
FIG. 6 is a representation of a row from the ChangeData table illustrated in FIG. 2.
FIG. 7 is a representation of a row from the Unit of Work table illustrated in FIG. 2.

The operation of the system will now be described in more detail. FIG. 5 represents a portion of the activity log 32 recorded by the data base manager 30 illustrated in FIG. 2. Various marker records and transition records are not shown for simplicity. The illustrated portion begins with an update event 60 indicated as Update 1 having a log sequence number, which in the illustrated system corresponds to the relative byte address (RBA), with a value of 0. A commit order 62 is the next event in the log, having an RBA of 100. A "Begin Unit of Recovery" record is the next event (RBA=200) 64 indicating a recorded event. A time stamp marker having a time value of 9:04 AM is the next event 66, indicating the initialization of a table copy. The time stamp marker has an RBA of 300. An associated commit order 68 is next, having an RBA of 400. The next Begin Unit of Work record 70 occurs with an RBA of 500. This value becomes the unit of work identifier for the associated transaction. Following are three update events 72, 74, 76 having respective RBA values of 600, 700, and 800. The commit order for the three updates is the next event 78 in the log and has an RBA value of 900. Finally, the next Begin Unit of Recovery record 80 (RBA=1000) and associated update 82 (RBA=1100) are the next events in the activity log.

FIG. 6 illustrates the ChangeData table rows generated by the Log Read Processor for the activity portion of FIG. 5. The first column in the table lists the arbitrary key for indexing the table, selected as known to those skilled in the art. The next column corresponds to the activity log event, in the illustrated log comprising update events. The next column contains the unit of work identifier, which corresponds to the RBA of the begin UR event in a transaction. This number identifies the transactional update. Thus, the first three rows 82, 83, 84 of the table have identical unit of work identifiers and the last row 85 has a different unit of work identifier associated with its begin UR event. The next column in the table includes the intent sequence number, which corresponds to the RBA value of the particular event. Hence, each row associated with a transaction has a different intent sequence number.

FIG. 7 illustrates the UOW table row generated by the Log Read Processor for the activity portion of FIG. 5. Only one entry is illustrated in the table because only one transaction from the activity log excerpt has committed. The unit of work corresponding to the update event having an RBA of 1100 has not yet committed. Thus, as described above, the UOW table includes columns for the unit of work identifier, the commit sequence number (which the Log Read Processor assigns as the RBA of the transaction commit order), and the time stamp value for the most recent time stamp read from the activity log.

Figure 8:
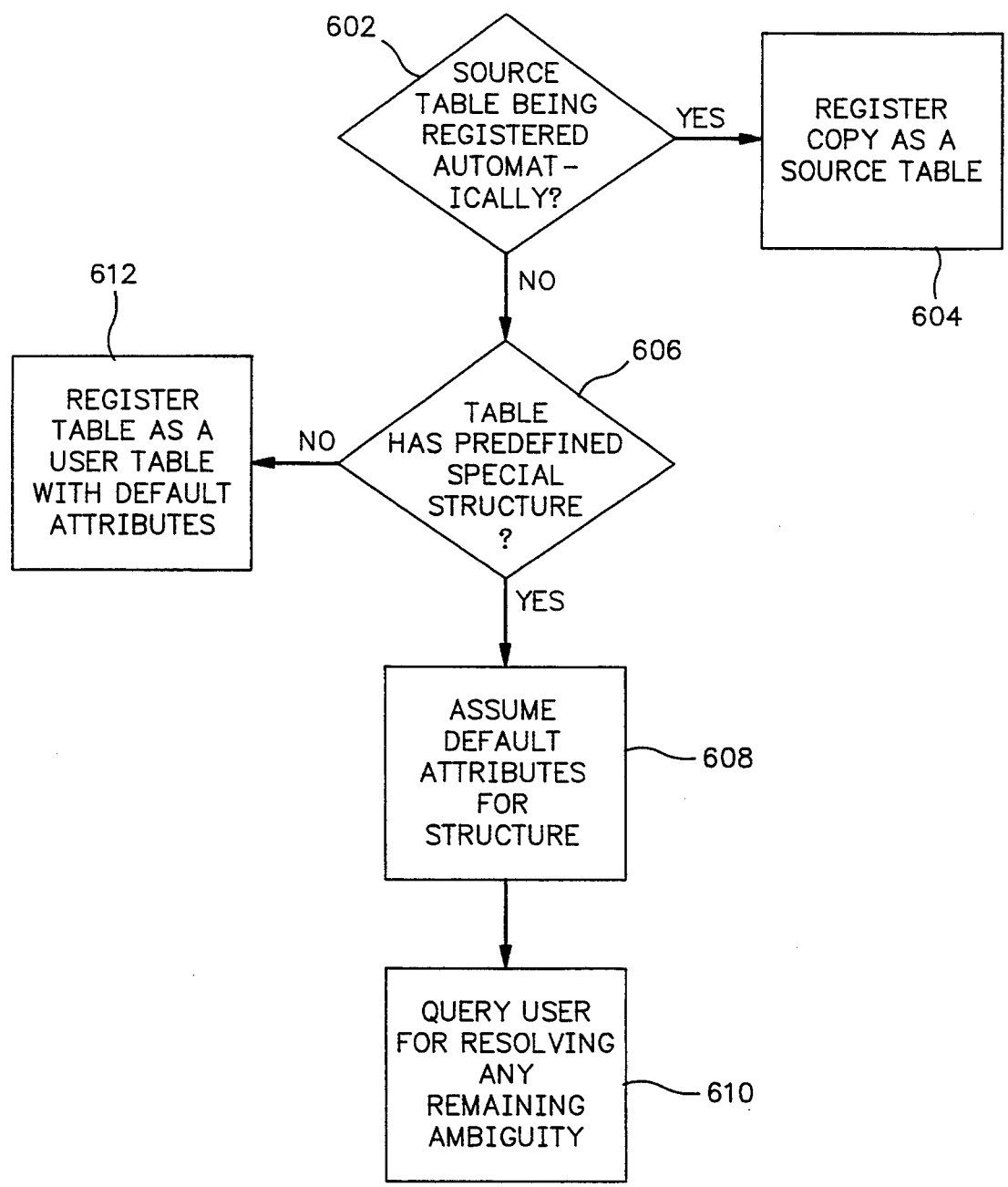
FIGS. 8, 9, 10, 11, 12, 13, 14, 15, and 16 are flow diagrams illustrating the steps carried out in copy operations of the system illustrated in FIG. 2.

FIG. 8 is a flow diagram illustrating the registration of attributes for a new copy source table. As noted above, an administrative interface provided by a software process of the Apply Processor or the data base manager ensures that tables are registered upon initial definition, such as when a copy of a user table is being requested. At the decision box numbered 602, the system determines if the source table in a copy request is being registered automatically. Automatic registration occurs, for example, when a refresh operation provides a snapshot table (in this case, the source table of the copy request) and applies change operations to the table to create a refreshed (target) snapshot table.

If the table is being registered automatically, an affirmative outcome at the decision box 602, then all attributes of the table are previously known, having been resolved during the table subscription process. Therefore, the copy can be registered as a source table without the need for interactively asking the user for any further attribute information. This is indicated at the flow diagram box numbered 604, indicating automatic registration. If the table is not registered automatically, a negative outcome at the decision box numbered 602, then the system next determines if the table has a structure that matches one of the predefined structures supported by the data base management system 30. The administrative interface determines the structure by examining appropriate columns of the RefreshControl table. If the table has a predefined structure, then default attributes are assumed at the flow diagram box numbered 608. Depending on the predefined structure and default attributes, it may be necessary to interactively query the user to resolve any remaining ambiguity of attribute values, as indicated by the flow diagram box numbered 610. If the table does not have a predefined structure, then at the flow diagram box numbered 612 the table is registered as a user table using only default attributes, without having to ask the user for any further attribute information. In this way, a new copy source table is registered and thereby becomes known to the Apply Processor and Log Read Processor.

Figure 9:
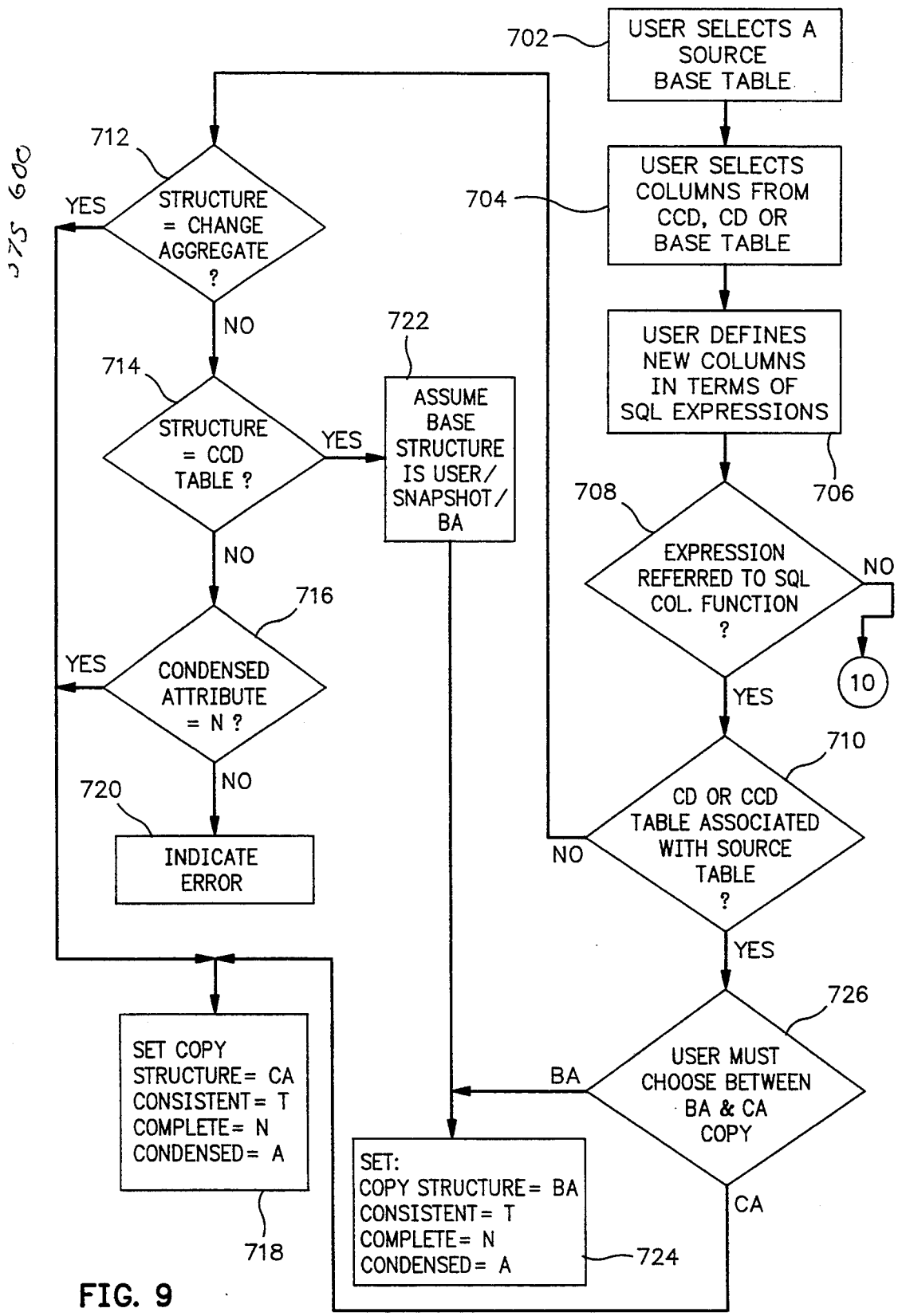

FIG. 9 illustrates how attributes of a new copy are determined during the subscription definition phase of the copying operation. The copy operation begins with the subscription definition, or copying of an already registered table, when an interactive user selects a source base table in a copy request, as indicated by the flow diagram box numbered 702. Next, the flow diagram box numbered 704 illustrates that the system 10 follows a hierarchy of tables from which source copying will commence. In particular, after an interactive user selects source columns of a user table to copy from, the Apply Processor determines if a ConsistentChangeData (CCD) table is associated with the source table. In this context, the source table can comprise any one of the tables that can be copied, including user tables, ConsistentChangeData tables, snapshot copy tables, and aggregate tables. If the Apply Processor determines that a ConsistentChangeData table is associated with the source table, then it copies change operations from the ConsistentChangeData table and applies them to the base user table. If there is no ConsistentChangeData table associated with the base table, then the processor determines if there is a ChangeData (CD) table associated with the source table. If there is, then the Apply Processor copies the associated change data columns and applies them to the source table. If none of the former cases apply, then the Apply Processor simply copies the selected portions of the base table.

Next, at the flow diagram box numbered 706, an interactive user defines any new columns in terms of SQL expressions, such as through an SQL query request. If the SQL expression referred to an SQL column function (box 708), then at the decision box numbered 710 the system determines if there is a ChangeData or ConsistentChangeData table associated with the source table. If there is not, then the system proceeds to determine if the base structure corresponds to one of a series of predefined structures. At the decision boxes numbered 712, 714, and 716, the system checks for a change aggregate, ConsistentChangeData table, and a condensed attribute of N, respectively. As indicated in the flow diagram box numbered 718, the attributes of the copy table are defined accordingly. An error indication is provided at the box numbered 720 if none of the cases apply. If the base structure of the table corresponds to a ConsistentChangeData table, then at the flow diagram box numbered 722, a base structure is assumed for the table comprising a user table associated with a snapshot copy, and also a base aggregation (BA) table. At the box numbered 724, the copy table attributes are defined accordingly. If the outcome at the decision box 710 determines that there is a user table and ChangeData table or ConsistentChangeData table association, then at the flow diagram box numbered 726, the system interactively asks the user to choose between a base aggregation table and a change aggregation (CA) table. As before, the table attributes are defined accordingly, at the flow diagram boxes numbered 724 and 718, respectively.

Figure 10:
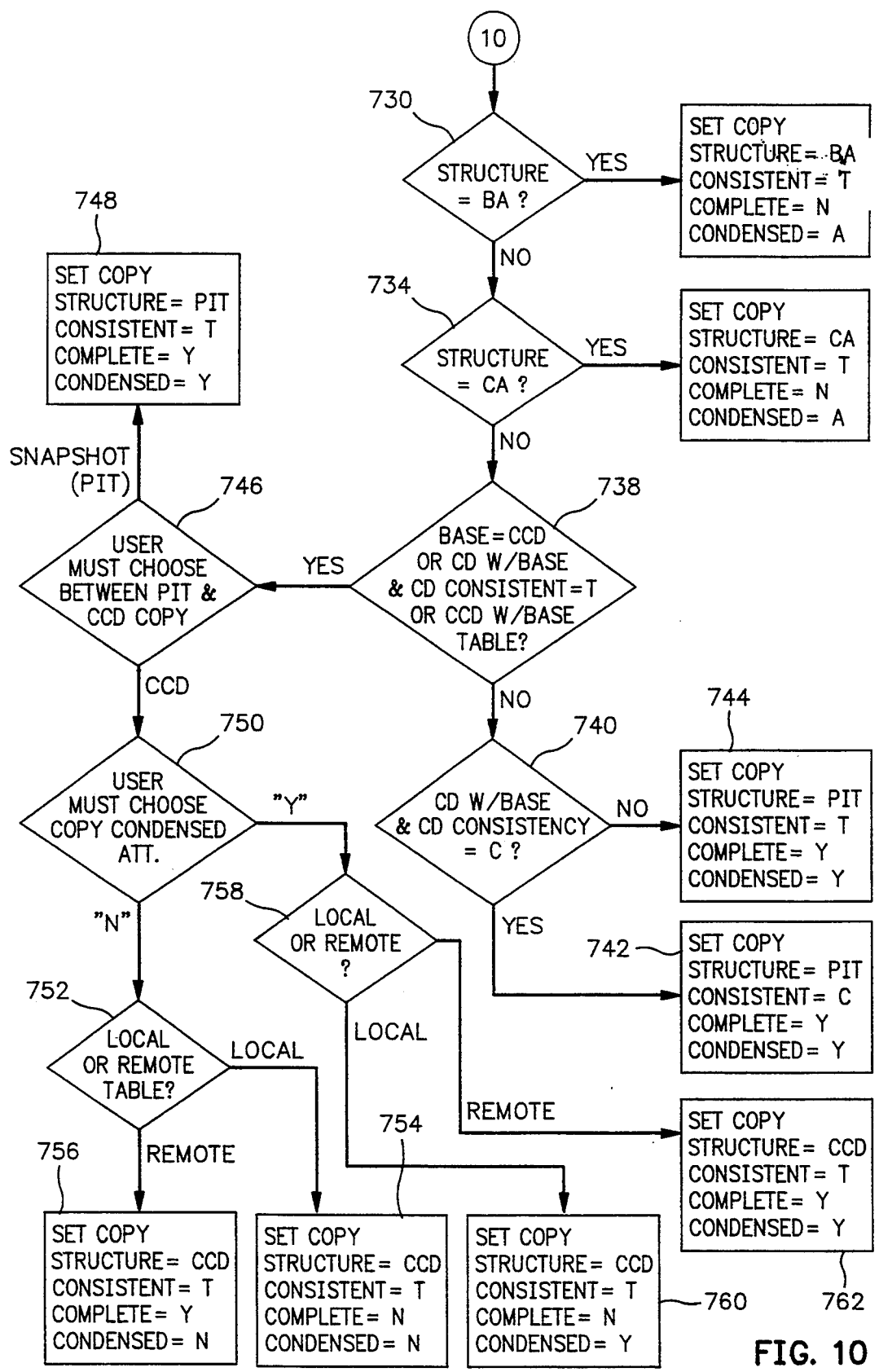

If the SQL expressions did not refer to an SQL column function at the decision box numbered 708, then processing proceeds at the decision box numbered 730 (the off-page connector "10" indicates the diagram is resumed at FIG. 10), where the system determines if the base structure of the table corresponds to a base aggregate table. If the base structure is a base aggregate, then the table attributes are defined accordingly in the flow diagram box numbered 732. If the table is not a base aggregate, the system next determines if the base structure is a trend aggregate (TA) at the decision box numbered 34. If it is a trend aggregate, then the table attributes are defined accordingly at the flow diagram box numbered 736. In each case, when table attributes are defined, the subscription definition phase ends.

If the base structure is not a trend aggregate, a negative outcome at decision box 34, the system next determines if the base structure is a ConsistentChangeData (CCD) table or is a ChangeData (CD) table associated with the source table and if the attribute for table consistency is equal to "T" or is a ConsistentChangeData table associated with the source table at the decision box numbered 738. In the case of a negative outcome, the system next determines if there is a ChangeData table associated with the source table and having a consistency attribute equal to "C" at the decision box numbered 740. The outcome of the decision box defines the table attributes, as illustrated in the flow diagram boxes numbered 742 and 744.

An affirmative outcome at the decision box 738 results in the system producing an interactive query to the user to choose between a point-in-time snapshot (PIT) copy or a ConsistentChangeData table copy at the decision box numbered 746. Selection of a snapshot copy determines the tables attributes, as indicated at the flow diagram box numbered 748. Selection of a ConsistentChangeData table copy results in the system asking another interactive question of the user to select between a condensed attribute of "Y" or "N" at the decision box numbered 750.

If the condensed attribute is selected to be "N", the system next checks to determine if the table is a local table or remote table at the decision box numbered 752. In each case, determining if the copy table is to be local or remote determines the table attributes as illustrated in flow diagram boxes 754 and 756, respectively. If the user selects a condensed attribute of "Y" at the decision box numbered 750, then the system again interactively checks to determine if the table is local or remote at the decision box numbered 758, thereby defining the table attributes at the flow diagram boxes numbered 60 and 762, respectively.

Figure 11:
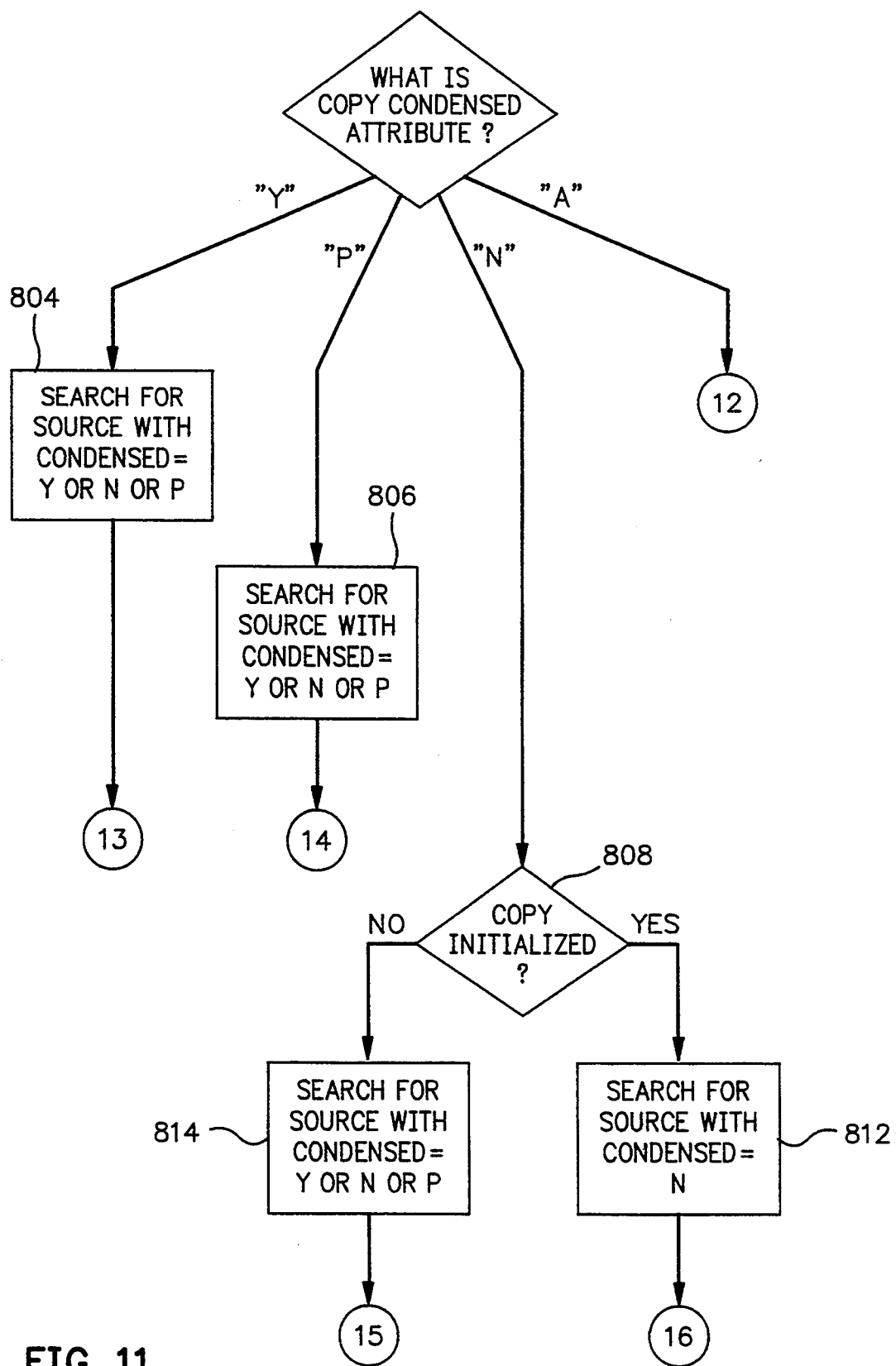

FIG. 11 illustrates the steps followed by the system 10 in using the predefined attribute information when a copying operation is carried out. The system assumes that potential copy sources are all derived from the same original source, that is, a user data table. At the box numbered 802, different processing is carried out depending on whether the condensed attribute of the source table is set to "Y", "P", "N", or "A", as indicated by the flow diagram boxes numbered 804, 806, 808, and 810 (FIG. 12), respectively.

If the condensed attribute is "Y" then the system next searches for a source with the condensed attribute set to "Y" or "N" or "P" (box 804). A similar result obtains for a source table condensed attribute set to "P" (box 806). If the source table condensed attribute is set to "N" then the system checks to determine if the copy has been initialized at the decision box numbered 808. If the copy has been initialized, at box 812 the system looks for a source table with a condensed attribute set to "N" and if the copy has not been initialized then at box 814 the system looks for a source table with a condensed attribute of "Y" or "N" or "P". If the source condensed attribute is set to "A" then the system checks the copy structure attribute for being either a base aggregate table or a change aggregate table, as indicated at box 810 (the off-page connector "12" indicates the flow diagram continues at FIG. 12).

Figure 12:
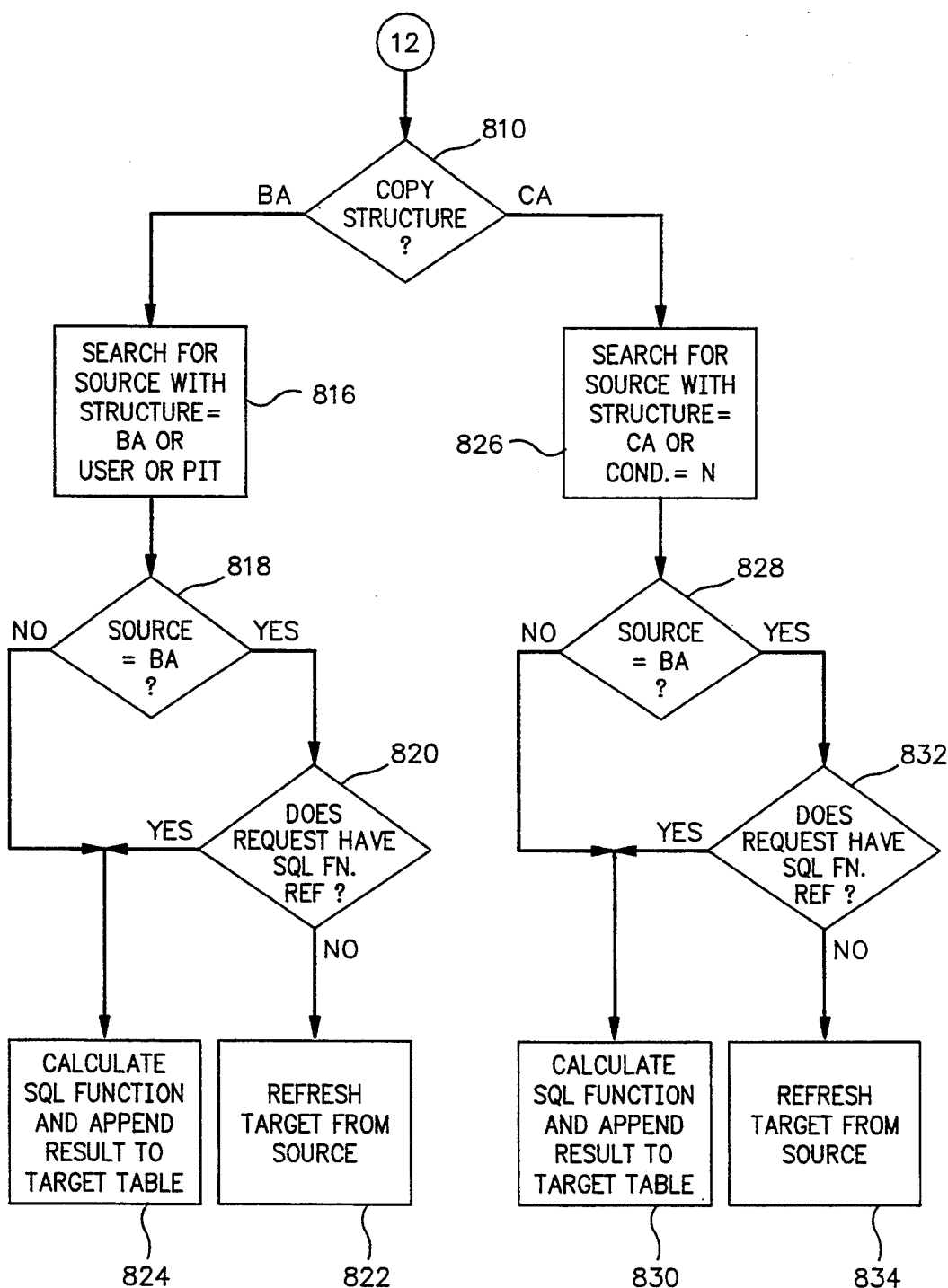

In FIG. 12, if the copy structure attribute indicates a base aggregate (BA) table, then at box 816 the system searches for a source table with a structure of a base aggregate table or a user table or a point-in-time snapshot (PIT) copy. Next, at decision box 818, the system checks to see if the source table structure is that of a base aggregate table. If it is, then at decision box 820 the system checks to see if the copy request contains an SQL function reference. If it does not contain an SQL function reference, then at box 822 the system refreshes the target table from the named source table. This completes the copy operation. If the request does contain an SQL function reference, then at box 824 the system calculates the SQL function value and appends the result to the target table. At the decision box numbered 818, if the source table structure is not a base aggregate, then the system assumes an SQL function and proceeds with operation at the box numbered 824.

If the copy structure attribute at decision box 810 indicated that the table has a change aggregate (CA) structure, then at box 826 the system searches for a source table with a structure of a change aggregate table or with a condensed attribute set to "N". Next, at the decision box numbered 828 the system checks whether the structure of the source table is that of a base aggregate table. If the structure is not a base aggregate, then at box 830 the system assumes a change aggregate and therefore calculates the SQL function and appends the result to the target table. If the structure of the source table is that of a base aggregate table, then at decision box 832 the system checks to see if the copy request contains an SQL function. If it does, then processing proceeds to box 830 to calculate the SQL function and append the result. If the request does not contain an SQL function, then at box 834 the system refreshes the target table from the source table, completing copy processing for condensed attribute "A" values.

Figure 13:
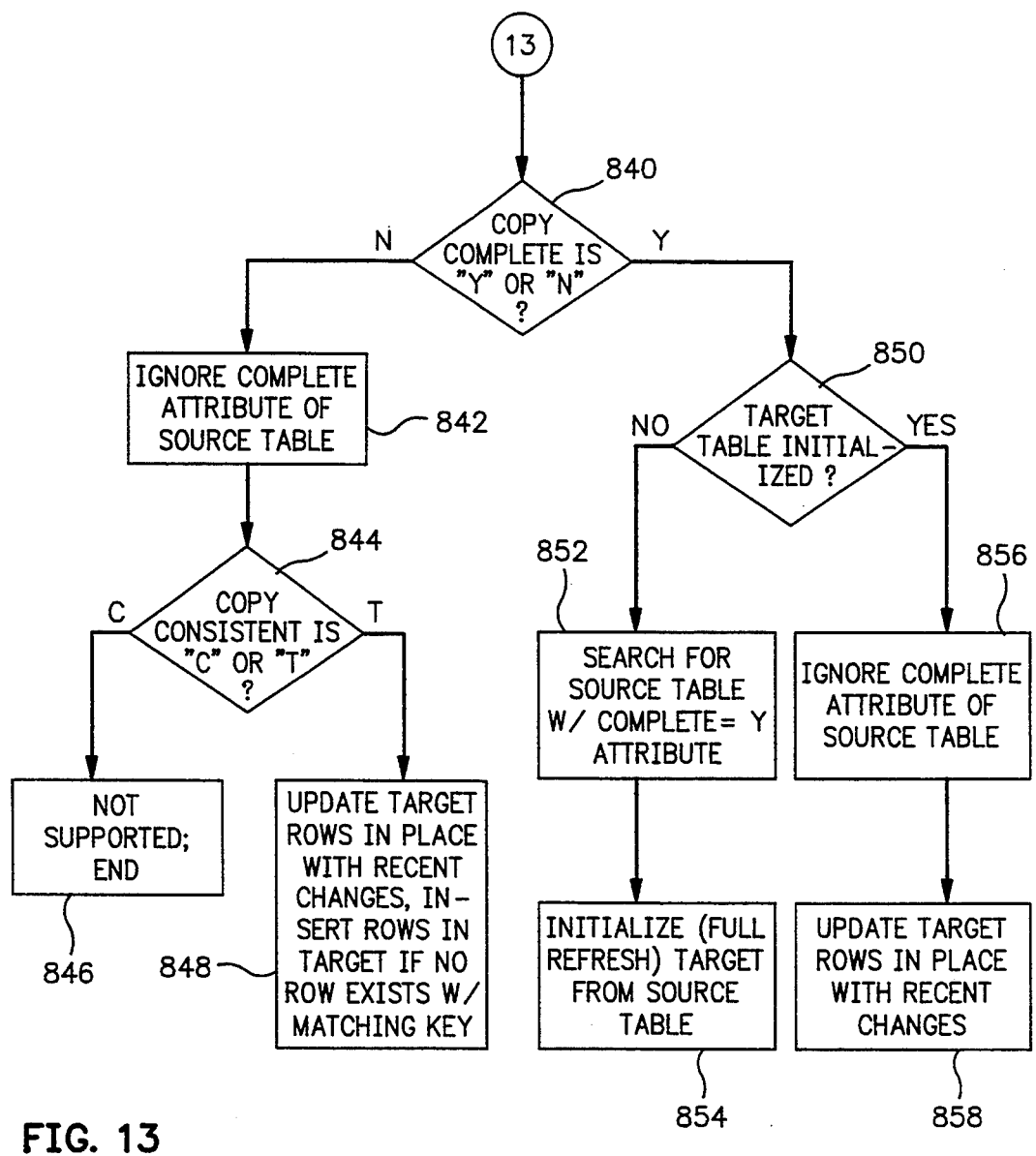

If the condensed attribute checked at decision box 802 (FIG. 11) was set to "Y" then processing proceeds after the search of condensed attributes (box 804) to the decision box numbered 840 (FIG. 13), where the system determines if the completeness attribute is set to "N" or to "Y". If the value is "N" then the system ignores the completeness attribute, as noted at box 842, and then checks the value of the consistency attribute at decision box 844. If the consistency attribute is set to "C" then the operation is not supported by the system and copying ends, with other system operations continuing as indicated by the continuation box numbered 846. If the consistency attribute is set to "T" then the target table is updated. As will be known to those skilled in the art, rows are inserted into the target if no row exists with matching primary key values and rows are updated in place otherwise.

If the completeness attribute checked at decision box 840 was set to "Y" then at decision box 850 the system next checks to see if the target table is initialized. If it is not, then at box 852 the system searches for a source table with a completeness attribute set to "Y" and then at box 854 initializes (or refreshes, as the case may be) the target table from the source table, ending the copy operation. If the target was initialized, then the system ignores the completeness attribute, as noted at box 856, and then at box 858 updates the rows of the target table with recent change operations using SQL routines known to those skilled in the art. This completes copy operations for source tables having a condensed attribute set to "Y".

Figure 14:
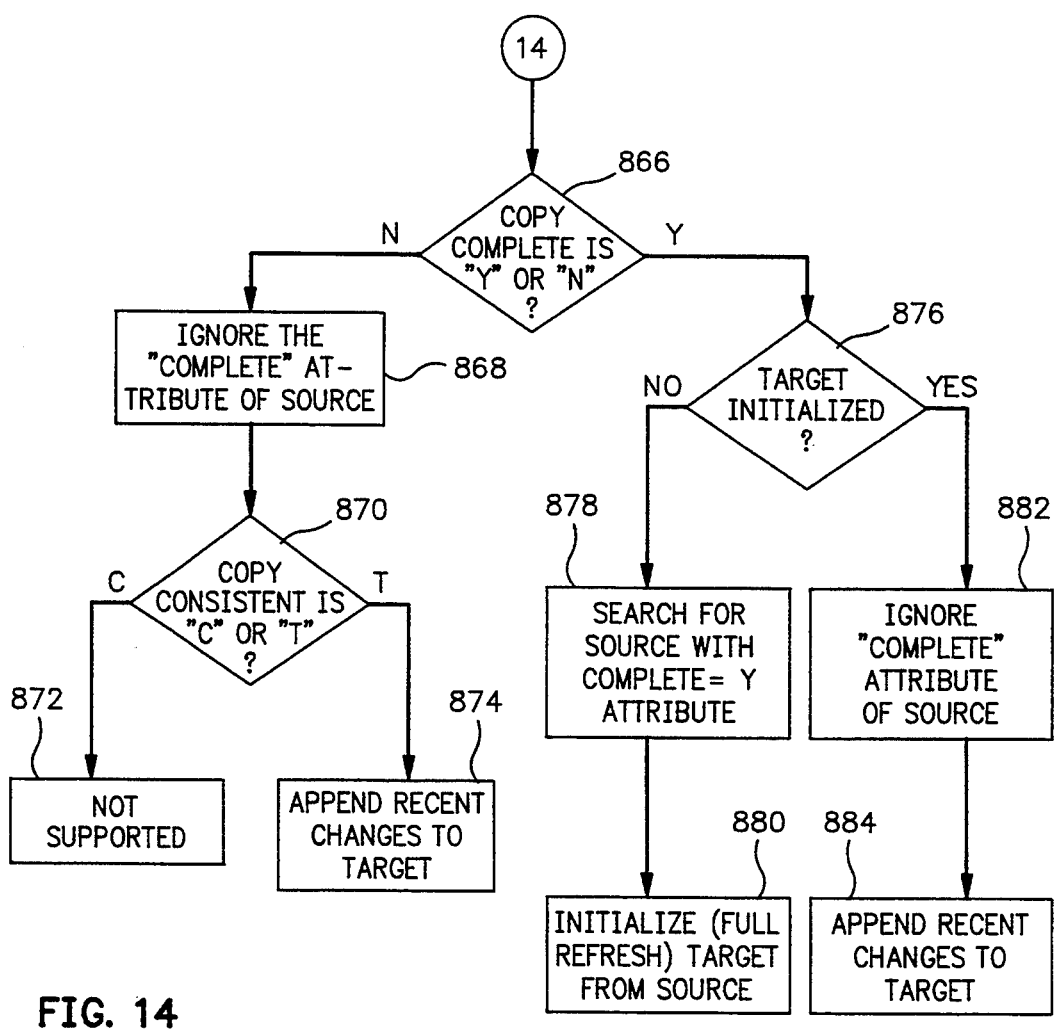

If the condensed attribute checked at decision box 802 (FIG. 11) was set to "P" 0 then processing proceeds after the search of condensed attributes (box 806) to the decision box numbered 866 (FIG. 14), where the system determines if the completeness attribute is set to "N" or "Y". If the attribute is set to "N" then the system ignores the completeness attribute, as noted at box 868, and then checks to see if the consistency attribute is set to "C" or to "T" at box 870. A consistency attribute set to "C" in this case is not supported in the preferred embodiment, therefore ending copy processing at box 872. If the consistency attribute is set to "T" then at box 874 the recent change operations are appended to the target table.

If the completeness attribute was determined at decision box 866 to be "Y" then at the decision box numbered 876 the system checks to determine if the target table has been initialized. If it has not, then at box 878 the system searches for a source table with a completeness attribute set to "Y" and then at box 880 initializes (or refreshes, as the case may be) the target table from the source table, ending the copy operation. If the target was initialized, then the system ignores the completeness attribute, as noted at box 882, and then at box 884 appends the recent change operations to the target table. This completes copy operations for source tables having a condensed attribute set to "P".

Figure 15:
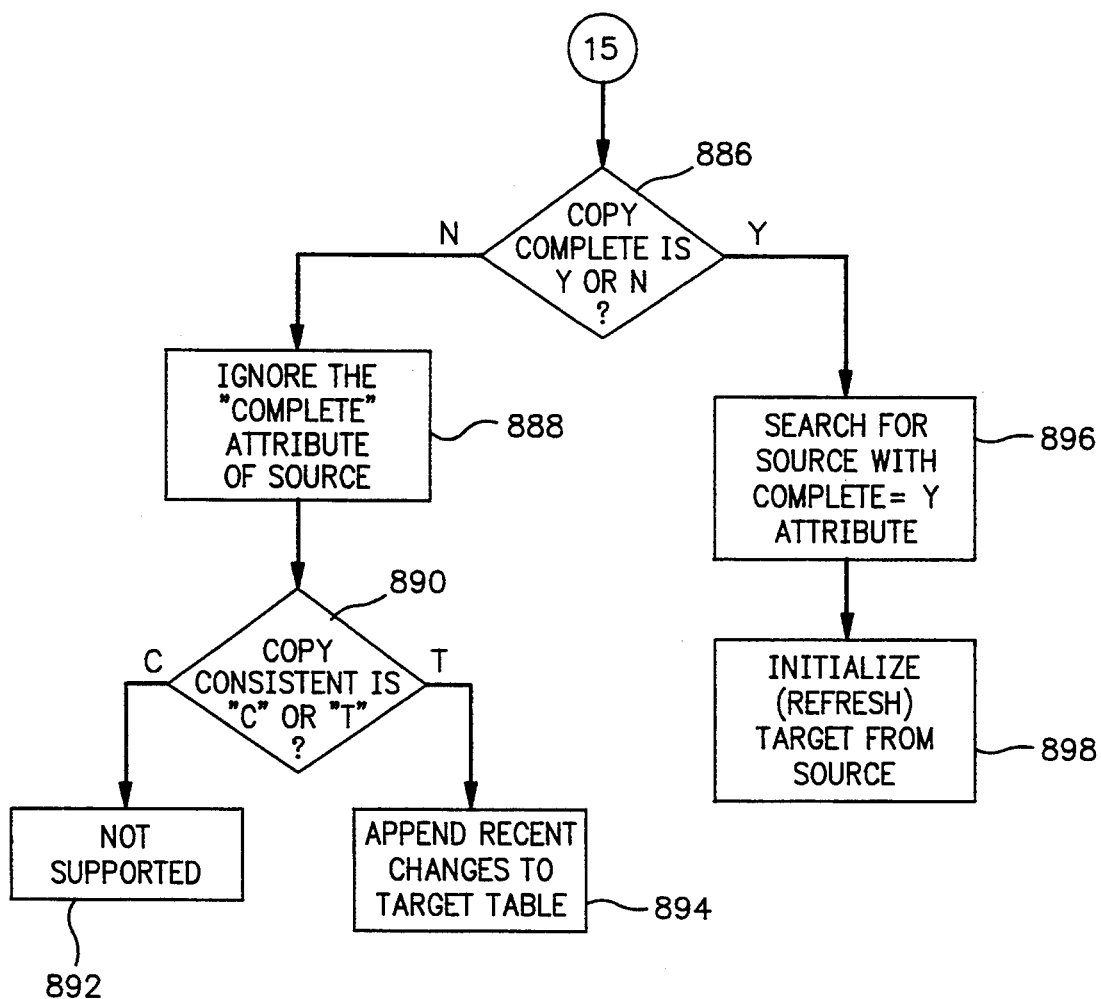

For source tables having a condensed attribute set to "N" (FIG. 11) and having copies that are not initialized, after the search for source tables specified at flow diagram box 814, the system proceeds at decision box numbered 886 (FIG. 15) to determine if the completeness attribute is set to "N" or "Y". If the attribute is "N" then the system ignores the completeness attribute, as noted at box 888, and then at decision box 890 the system checks to determine if the consistency attribute is set to "C" or "T". A consistency attribute set to "C" in this case is not supported in the preferred embodiment, therefore copy processing is ended at box 892. If the consistency attribute is set to "T" then at box 894 the recent change operations are appended to the target table. If the completeness attribute set to "Y" then at box 896 the system searches for a source table with a completeness attribute set to "Y" and then at box 898 initializes (or refreshes, as the case may be) the target table from the source table. This completes copy operations for source tables having a condensed attribute set to "N" and having an initialized copy.

Figure 16:
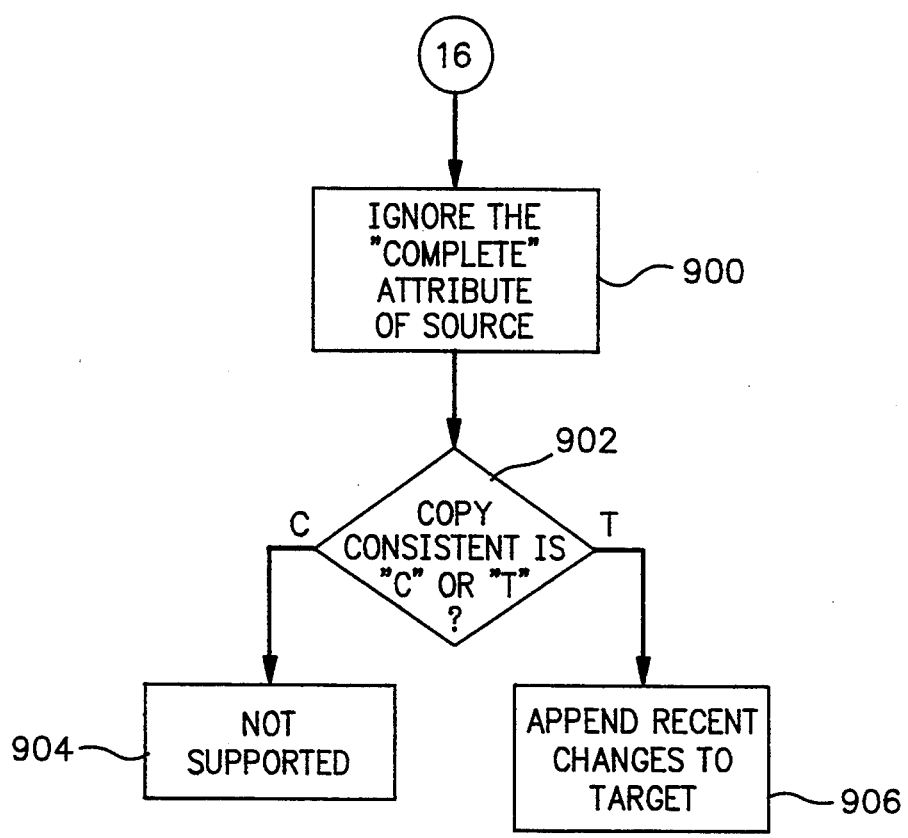

If the source table has a condensed attribute set to "N" (FIG. 11) and has copies that are initialized, after the search for source tables specified at box 812, the system ignores the completeness attribute, as indicated at the flow diagram box numbered 900 (FIG. 16), and then proceeds to the decision box numbered 902 to check whether the consistency attribute is set to "C" or to "T". A consistency attribute set to "C" in this case is not supported in the preferred embodiment, therefore copy processing is ended at box 904. If the consistency attribute is set to "T" then at box 906 the recent change operations are appended to the target table. This completes copy operations for source tables having a condensed attribute set to "N".

The data base management system as described above permits simplified copying operations in which substantially all attributes necessary to specify a copy operation from a source table of a first structure to a target table of a second structure are inherently defined, enabling automated copy operations. In some cases, the user will be automatically queried to supply attribute information for which more than one option exists. In this way, a user is not burdened with specifying minute details of the copying operation in a complex data base management environment.

The present invention has been described above in terms of a presently preferred embodiment so that an understanding of the present invention can be conveyed. There are, however, many configurations for data base management systems not specifically described herein but with which the present invention is applicable. The present invention should therefore not be seen as limited to the particular embodiment described herein, but rather, it should be understood that the present invention has wide applicability with respect to data base management systems generally. All modifications, variations, or equivalent arrangements that are within the scope of the attached claims should therefore be considered to be within the scope of the invention.

I claim:

1. A method of supporting interactive copy requests from data base management system users in a computer system to enable copying from a source data table having a first structure to a target data table having a second structure, the computer system further having a central processor, a memory unit storing a plurality of data tables and a non-volatile storage medium, the users having interactive terminals for communicating with the data base management system and generating requests for point-in-time snapshot copies of selected portions of the user tables and generating updates to the user tables that are periodically propagated to the snapshot copies, the method comprising the steps of:

defining a user table such that substantially all attributes necessary to specify the structure of the table and whether the table is consistent, complete, and condensed are specified;

resolving any ambiguity in the user table definition by interactively querying the user defining the user table;

receiving a user request for copying a source table to a target table;

automatically determining the attributes of the target table in accordance with the attributes of the source table and the copy request; and executing the copy request.

2. A method of supporting interactive copy requests from data base management system users in a computer system to enable copying from a source data table having a first structure to a target data table having a second structure, the computer system including a central processor, a memory unit storing a plurality of data tables, and a non-volatile storage medium, the users having interactive terminals for communicating with the data base management system and generating requests for point-in-time snapshot copies of selected portions of the user tables and generating updates to the user tables that are periodically propagated to the snapshot copies, the method comprising the steps of:

defining a system change data control table having a row associated with each data table of the data base and having a column for storing the name of the associated table and table attributes specifying the table structure as either a user table, change history table, snapshot copy, or aggregate copy;

receiving a user copy request for copying a source table to a target table;

identifying a row in the change data control table corresponding to the source table;

determining attributes of the source table by identifying column values in the identified source table row of the change data control table;

identifying a row in the change data control table corresponding to the target table;

determining attributes of the target table by identifying column values in the identified target table row of the change data control table; and copying the selected rows and columns of the source table to a target table.

3. A method as defined in claim 2, wherein the step of defining a change data control table includes defining a column of the change data control table for storing an identifier of a user table from which the source table was derived.

4. A method as defined in claim 3, wherein:

the step of defining a change data control table includes defining a change data table that contains the update operations for the source table and further includes defining a column of the change data control table for storing the name of a change data table associated with the source table; and the step of determining source table attributes includes the step of determining if a change data table is associated with the source table.

5. A method as defined in claim 4, wherein the step of copying the source table includes propagating the updates from the change data table to the source table.

6. A method as defined in claim 5, wherein the step of defining a change data control table includes defining a column of the change data control table for storing a table condensed attribute of the source table indicating if update operation data from a change data table associated with an original table has been included in the source change data table.

7. A method as defined in claim 6, wherein the step of defining a change data control table includes defining a column of the change data control table for storing a table complete attribute of the source table indicating if all of the update operation data from a change data table associated with an original table for a predetermined time interval has been propagated to the source table.

8. A method as defined in claim 7, wherein the step of defining a change data control table includes defining a column of the change data control table for storing a table condensed attribute of a change data table associated with the source table indicating if update operation data from the source change data table will be included in a target change data table.

9. A method as defined in claim 8, wherein the step of defining a change data control table includes defining a column of the change data control table for storing a table complete attribute of the change data table indicating if all of the update operation data from the source change data table for a predetermined time interval has been propagated to the source table.

10. A method as defined in claim 9, wherein:

the step of defining a change data control table includes defining a consistent change data table that contains committed transactional update operations for the source table and further includes defining a column of the change data control table for storing the name of a consistent change data table associated with the source table; and the step of determining source table attributes includes the step of determining if a consistent change data table is associated with the source table.

11. A method as defined in claim 10, wherein the step of copying the source table includes propagating the updates from the consistent change data table to the source table.

12. A method as defined in claim 11, wherein the step of defining a change data control table includes defining a column of the change data control table for storing a table condensed attribute of the consistent change data table indicating if update operation data from a change data table associated with an original table has been included in the source change data table.

13. A method as defined in claim 12, wherein the step of defining a change data control table includes defining a column of the change data control table for storing a table complete attribute of the consistent change data table indicating if all of the update operation data from a change data table associated with an original table for a predetermined time interval has been propagated to the source table.

14. A computer system that facilitates copying data tables specified by users from a source data table having a first structure to a target data table having a second structure, the computer system comprising:

a memory unit for containing the data base tables;

a non-volatile storage medium;

a system clock;

a central processor unit, operating under control of the system clock, that controls input and output to the memory unit and receives copy requests from a plurality of users having interactive terminals for communicating with a data base management system of the central processor and generating requests for point-in-time snapshot copies of selected portions of the user tables and generating updates to the user tables that are periodically propagated to the snapshot copies;

change data control processing means for associating each table of the data base with attributes specifying the table structure as being either a user table, change history table, snapshot copy, or aggregate copy;

apply processing means for determining attributes of the source table specified in a user copy request by identifying source table attributes provided by the change data control processing means and for determining attributes of the target table specified in the user copy request by identifying target table attributes provided by the change data control processing means; and central processor means for implementing the copy request and copying selected rows and columns of the source table to the target table.

* * * * *